April 5, 1932.  C. S. BRAGG ET AL  1,852,286
BRAKE SYSTEM FOR AUTOMOTIVE VEHICLES
Filed May 24, 1929  5 Sheets-Sheet 1
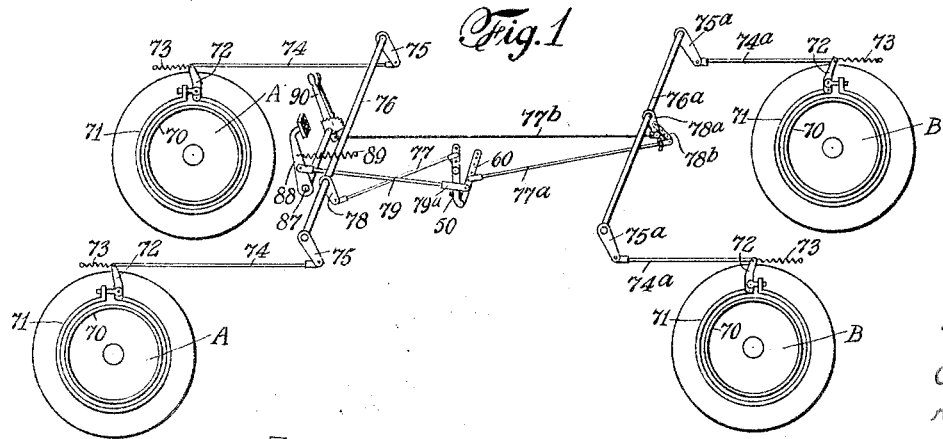
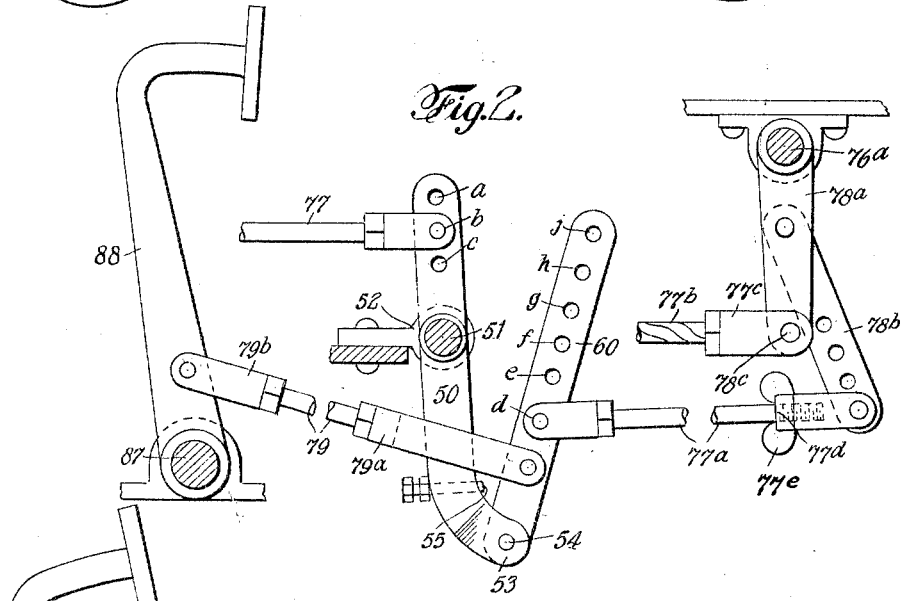
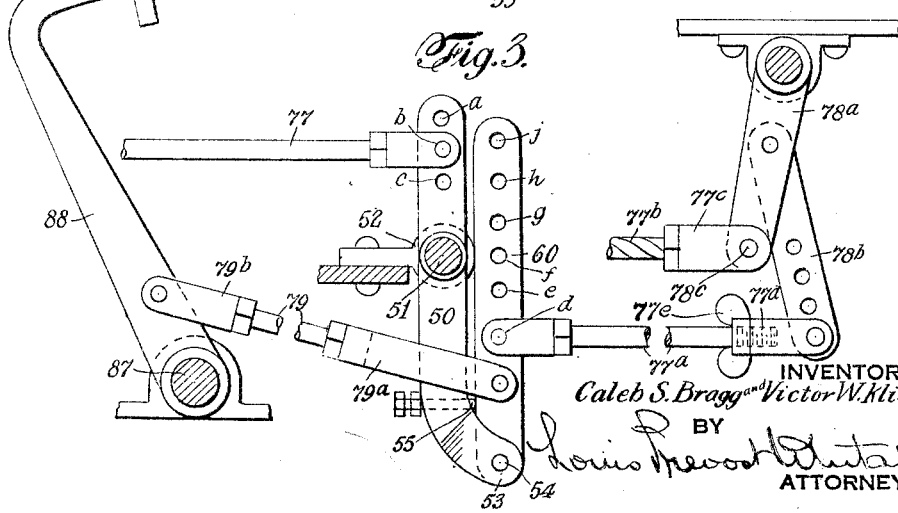
INVENTORS
Caleb S. Bragg and Victor W. Kliesrath
BY
ATTORNEY

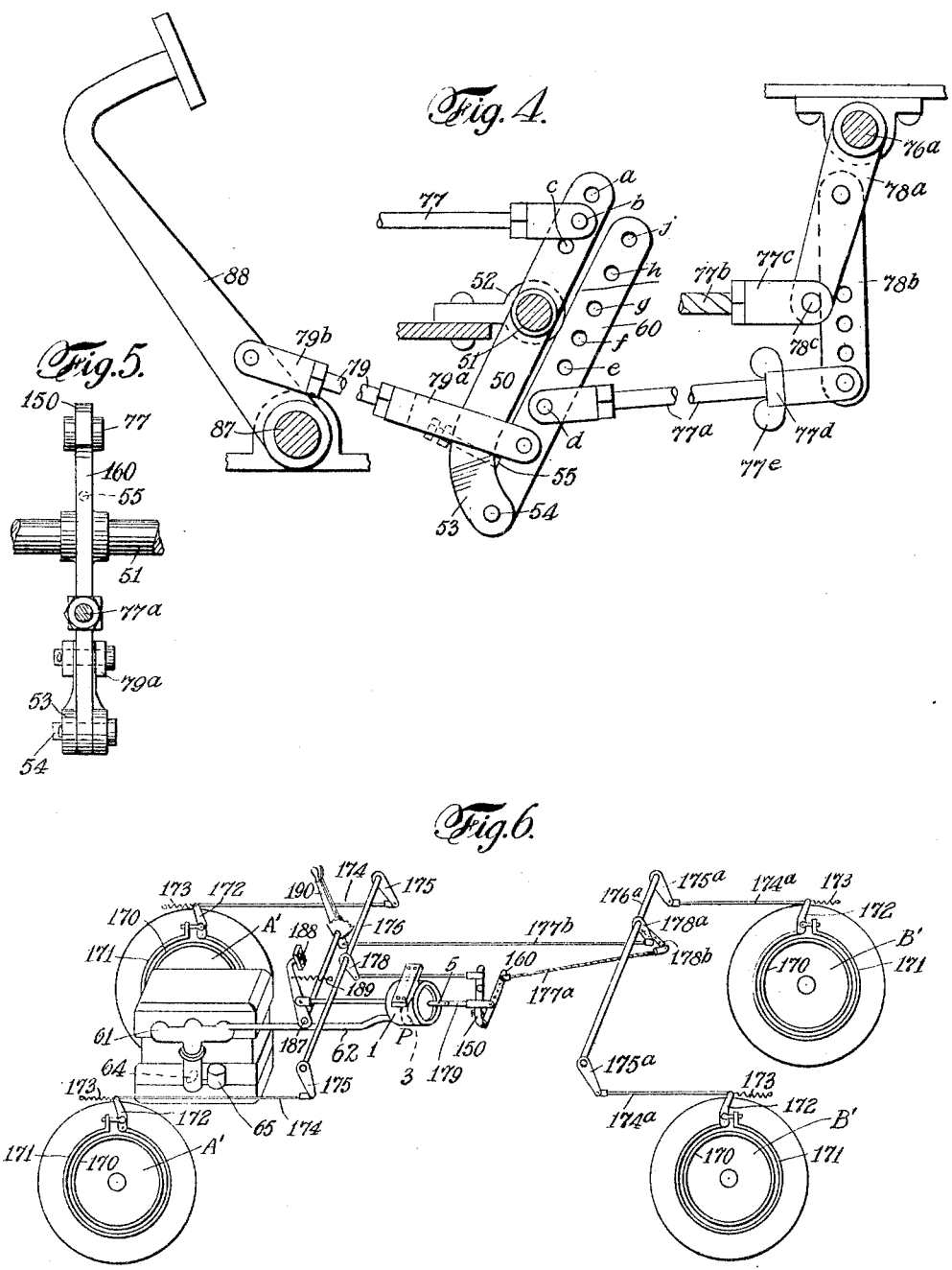

April 5, 1932.    C. S. BRAGG ET AL    1,852,286
BRAKE SYSTEM FOR AUTOMOTIVE VEHICLES
Filed May 24, 1929    5 Sheets-Sheet 3
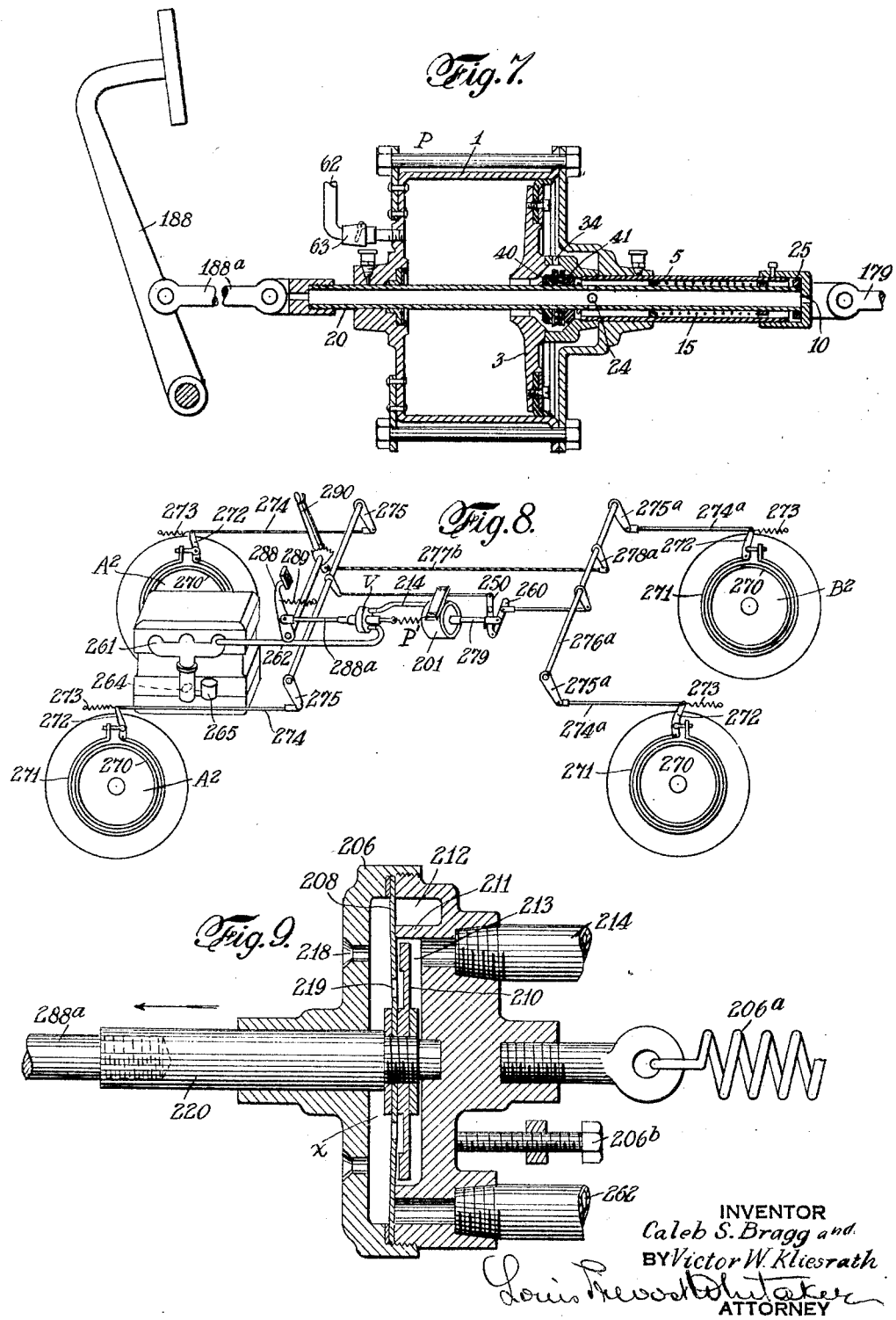
INVENTOR
Caleb S. Bragg and
BY Victor W. Kliesrath
ATTORNEY April 5, 1932.  C. S. BRAGG ET AL  1,852,286
BRAKE SYSTEM FOR AUTOMOTIVE VEHICLES
Filed May 24, 1929   5 Sheets-Sheet 4

INVENTOR
Caleb S. Bragg and Victor W. Kliesrath
BY
Louis Prevost Whitaker
ATTORNEY

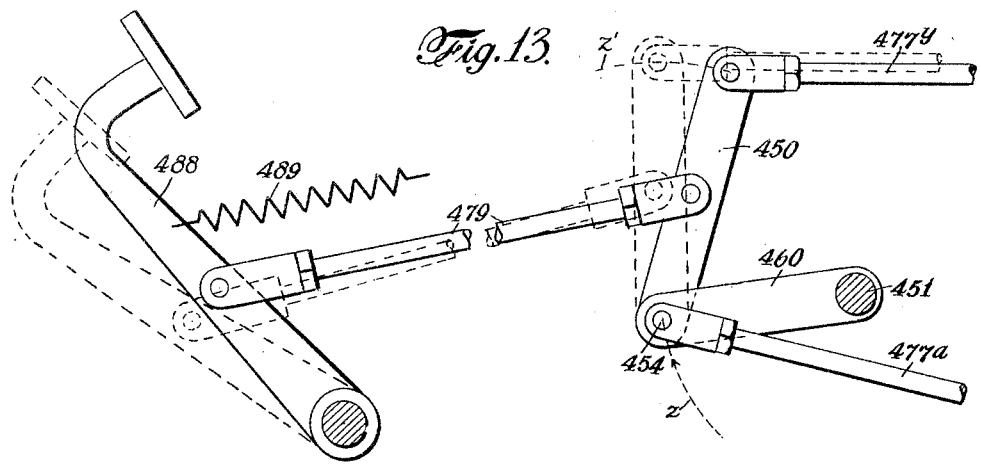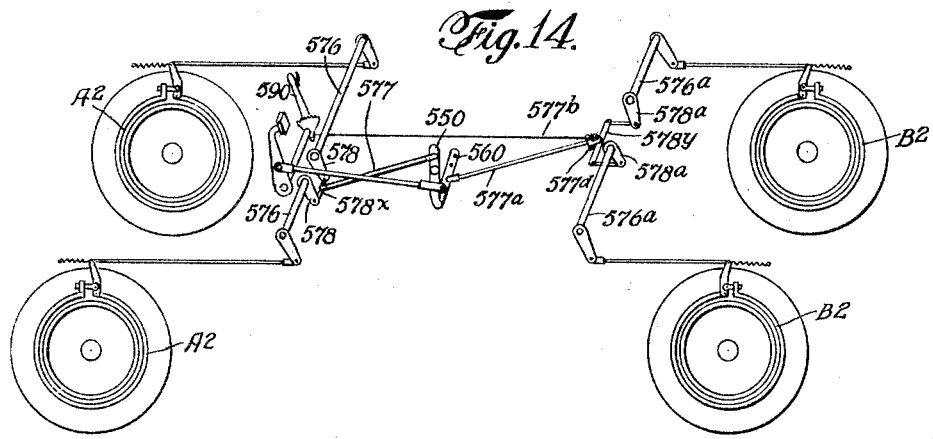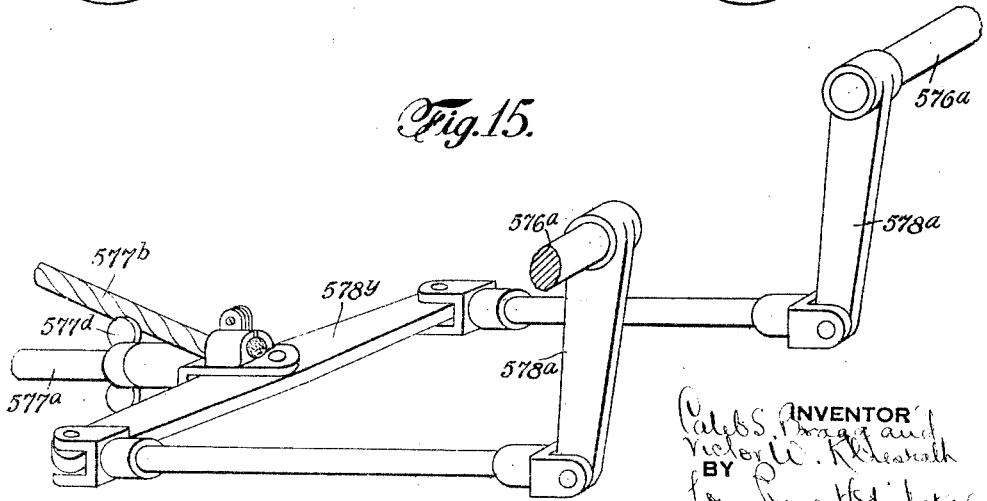

Patented Apr. 5, 1932

1,852,286

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed May 24, 1929. Serial No. 365,600.

Our invention consists in the novel features hereinafter described, reference being had to the accompanying drawings, which illustrate several embodiments of the invention selected by us for purposes of illustration, and the said invention is fully disclosed in the following description and claims.

Our invention consists in a novel brake mechanism for automotive vehicles having brake mechanisms for the wheels at each end of the vehicle, whereby the source of power for the application of the brakes, whether it be either physical force of the operator, or the power of a servo-motor or power actuator, may be applied to the brake mechanisms for wheels at opposite ends of the vehicle in a predetermined proportion, to effect efficient slowing down of the vehicle or "deceleration", as we term it, and thereafter automatically change the proportions in which the power is distributed, so as to apply the power in different and unequal proportions to the brake mechanisms for the wheels at the opposite ends respectively of the vehicle, to compensate for the transfer of the weight of the vehicle and load by the initial deceleration, and especially the transfer of additional weight to the front wheels.

In the accompanying drawings we have illustrated a number of embodiments of our invention showing its wide and general application in automotive vehicle construction and operation, but it is to be understood that other embodiments may be made of the invention within its scope as defined in the following description and claims, and our invention includes certain novel features of construction and combination of parts hereinafter described and particularly pointed out in the claims.

Referring to the drawings.

Fig. 1 is a diagrammatic view of a brake mechanism for an automotive vehicle provided with four wheel brakes and having our present invention embodied therein, the brakes being applied by physical force, distributing equally to all the brakes during the initial movement and thereafter distributing unequally between the front and rear wheel brakes.

Fig. 2 is an enlarged view of a portion of the apparatus illustrated in Fig. 1, showing the parts in their released positions.

Fig. 3 is a view similar to Fig. 2 showing the position of the parts at the end of the initial movement for the application of all of the brake mechanisms.

Fig. 4 is a view similar to Figs. 2 and 3, showing the position of the parts during the application of additional power which is distributed to a greater extent to the front wheel brakes.

Fig. 5 is a rear elevation of the power distributing levers illustrated in Figs. 1 to 4.

Fig. 6 is a diagrammatic view similar to Fig. 1, showing an embodiment of our invention in which the brakes are applied by a servo-motor supplemented by the physical force of the operator, in substantially the same manner as is illustrated in the preceding figures.

Fig. 7 is a detail sectional view of one form of servo-motor which may be employed in the manner illustrated in Fig. 6.

Fig. 8 is a diagrammatic view showing another arrangement in which the power is applied by a servo-motor or power actuator only.

Fig. 9 is an enlarged view of the controlling valve mechanism for the servo-motor illustrated in Fig. 8.

Fig. 13 is a view similar to Fig. 12 showing in full lines the positions of the parts after the initial application of the brakes, and showing in dotted lines the further application of power to brake mechanisms for the front wheels only.

Fig. 14 is a view similar to Fig. 1, showing another modification of the power distributing means.

Fig. 15 is an enlarged detail perspective view illustrating a portion of the construction shown in Fig. 14.

Figure 10:
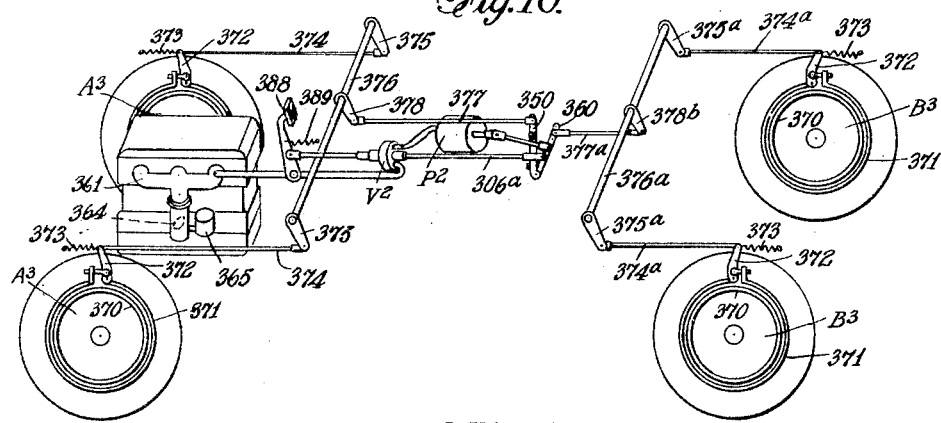
Fig. 10 is a diagrammatic view similar to Fig. 6, in which the power is applied by a servo-motor and additional power may be applied by the operator through the controlling valve mechanism for the servo-motor, which is located exterior thereto.

Referring to the embodiment of our invention illustrated in Figs. 1 to 5 inclusive, we have illustrated in Fig. 1, diagrammatically a brake system for an automotive road vehicle provided with front wheel brake mechanisms, indicated at A, A, and rear wheel brake mechanisms, illustrated at B, B. It is to be understood, however, that our invention is equally applicable whether two or more wheels are provided at either or both ends of the vehicle. The brake mechanism may be of any desired type, and it will be assumed for purposes of description that the front and rear wheel brake mechanisms are of substantially the same size and require substantially the same movement of their power applying connections to move them to a predetermined extent, it being understood, however, that our invention is equally applicable to brake systems in which the front and rear wheel brake mechanisms respectively may be of different sizes or different types, the connections between the power applying means and the brake mechanisms being in such instance adjusted to produce the desired result, in the initial application of the brakes.

In the present instance each of the brake mechanisms is shown for example as provided with a brake drum, 70, brake band, 71, brake applying lever, 72, and retracting spring, 73. The levers, 72, of the front wheel brakes are connected by links, 74, to arms, 75, on a rock shaft extending transversely of the vehicle and suitably mounted on the chassis. The brake actuating lever, 72, of the rear wheel brakes, B, are connected by links, 74$^a$, with arms, 75$^a$, on a rock shaft, 76$^a$, extending transversely of and secured to the chassis of the vehicle.

In the embodiment of our invention illustrated in Fig. 1, the brake mechanisms are applied by the physical power of the operator exerted primarily through the usual foot lever, indicated at 88, and provided with the usual retracting spring, 89, the foot lever being mounted pivotally on a shaft, 87, supported upon the chassis of the vehicle. In this instance the braking power is distributed to the front and rear wheel brakes, through what I term for convenience a primary and secondary distributing lever. Of these, 50 represents the primary power distributing lever, which is pivotally supported between its ends on a shaft, 51, mounted in a suitable bearing, 52, supported by the chassis of the vehicle. One end of this lever is connected with the front wheel brake mechanisms. In this instance we have shown the upper end of the lever connected by a link, 77, with an arm, 78, on the rock shaft, 76, for applying the front wheel brakes, A, A, equally with respect to each other. Any form of equalizing device between the two brake mechanisms for the front wheels may be employed, and the use of such equalizing means is so well known that we have not illustrated any particular equalizing device, and it will be assumed that the brakes for each pair of wheels will be applied equally as between them. The upper end of the lever, 50, is shown provided with a plurality of apertures, $a$, $b$, and $c$, for example, the link, 77, being in this instance connected at the aperture, $b$. To the lower end of the primary lever, 50, which is conveniently provided with a yoke, 53, there is pivoted a secondary power applying lever, 60, extending upwardly from the pivotal connection, indicated at 54. The secondary lever, 60, is connected by a link, 77$^a$, with the rear wheel brake mechanisms. In this instance we have shown the rock shaft, 76$^a$, provided with an arm, 78$^a$, to which an auxiliary arm, 78$^b$, is pivoted in such manner that it can move rearwardly with respect to the arm 78$^a$, but when moved forwardly will carry the arm, 78$^a$, with it. This may be effected by projecting the pin 78$^c$. In this instance we have shown the arm, 78$^a$, connected by a cable, 77$^b$, with the hand lever, 90, mounted on the chassis and provided with the usual locking segment and pawl, the cable being connected by a suitable fitting, 77$^c$, with a pin, 78$^e$, at the lower end of the arm, 78$^a$, which pin may be conveniently engaged by the auxiliary arm, 78$^b$, when moved in the forward direction. This arrangement enables the rear wheel brake mechanisms to be operated independently of the front wheel brake mechanisms by the hand lever, 90, and the operation of the rear wheel brake mechanisms in conjunction with the front wheel brake mechanisms, by the foot lever without any interference between the two applications of power. The secondary power applying lever, 60, extends above the pivotal axis of the primary lever, 50, and is provided with a plurality of apertures below said axis, indicated at $d$, $e$, for example, and with a plurality of apertures, indicated at $g$, $h$, $j$, and an aperture indicated at $f$, being conveniently provided at a point where its axis will be in substantial alignment with the axis of the pivot shaft, 51, when the levers, 50 and 60, are brought into parallelism. It will be understood, as hereinafter explained, that the link, 77$^a$, extending to the rear wheel brake mechanisms, may be connected to the lever, 60, at any of the points indicated by the holes, $d$, $e$, $f$, $g$, $h$, $j$. In these figures it is shown connected to the lever, 60, at the hole, $d$, by a suitable pivot pin. The link, 77$^a$, is conveniently provided with an adjusting take-up means of any well known type, such a device being indicated at 77ᵈ, and including a wing nut, 77ᵉ, by turning which the effective length of the link, 77a, may be shortened for the purpose of taking up the wear of the brake bands or shoes and so adjusting the apparatus that there will be no danger of the foot lever striking the floor board before the maximum power possible has been applied to the brakes. The power applying means, in this instance the foot lever, 88, is connected directly with the secondary lever, 60, below the axis, 51, of the lever, 50, by means of a yoke, 79ᵃ, extending around the primary lever, 50, and a connecting rod or link, 79, which is connected with the lever, 88, by a suitable yoke, 79ᵇ. It will be seen by reference to Fig. 2, that the initial movement of the foot lever, 88, will exert force upon the lever, 60, tending to swing it forwardly on the axis, 54, of its pivotal connection with the lever, 50, which force is transmitted to the rear wheel brake mechanisms and to the lever, 50, causing it to turn on its axis, 51, and transmitting the force applied to said lever to the front wheel brake mechanisms. The lever, 60, will eventually be brought into contact with a part connected with the lever, 50, after which the two levers will swing on the axis, 51, of the lever, 50, as if they were one lever. We conveniently provide the lever, 50, with a stop, 55, in this instance in the form of a threaded set screw to engage the lever, 60, and limit the relative movement of the levers.

The brakes and their connections with the levers, 50, and 60, respectively, are so adjusted that both the front and rear wheel brakes will be applied up to a certain point before the lever, 60, comes into contact with the stop, 55, on the lever, 50, and the force will be distributed to the front and rear wheel brakes respectively, in accordance with the leverages provided by the respective levers, 50 and 60, but after the levers come into contact and during the further depression of the foot lever, 88, the front and rear wheel brakes will be applied in accordance with the leverages furnished by the lever, 50, alone, and we prefer to so arrange the connections that the front wheel brakes will be applied with more power than the rear wheel brakes. The rear wheel brakes may be further applied or held as applied, or actually released, depending upon the leverages employed.

Thus in the arrangement illustrated in Figs. 2, 3 and 4, the link 77ᵃ, for the rear wheel brake mechanisms is connected at the pivotal aperture, d, in the lever, 60, and after the lever, 60, has been brought into contact with the stop, 55, as indicated in Fig. 3, the further movement of the foot pedal will impart a greater movement to the link, 77, connected with the front wheel brake mechanisms than to the link, 77ᵃ, and will apply the front wheel brakes to a greater extent than the rear wheel brakes, as clearly shown in Fig. 4. It will also be seen by reference to these figures that if the link, 77ᵃ, were connected to the lever, 60, at the pivotal aperture, e, a still lesser amount of movement would be imparted to the rear wheel brake mechanisms after the levers, 50, and 60, came into contact, and that if the link, 77ᵃ, were connected to lever, 60, at the pivotal aperture, f, which substantially coincides with the axis, 51, of the lever, 50, when the two levers come together, the further application of power in such case would be imparted to the front wheel brake mechanisms only, and the rear wheel brake mechanisms would be held substantially as applied. It will also be seen that if the link, 77ᵃ, were connected to the lever, 60, at either of the apertures, g, h, or j, while both the front and rear wheel brakes would be applied to a predetermined extent before the lever, 60, came in contact with the lever, 50, the further application of power to said levers after such contact would further apply the front wheel brakes and actually release the rear wheel brakes.

It will also be seen that whatever the adjustment between the lever, 60, and the link, 77ᵃ, the levers 50 and 60, constitute an equalizing means between the front and rear wheel brakes up to the time that the lever, 60, makes contact with the stop, 55. Up to this time therefore, the brakes will be applied with substantially equal efficiency. Thereafter, this equalizing feature ceases and the front and rear wheel brakes may have the force applied unequally to them, as before described.

While as before stated, we prefer to so arrange the levers, 50 and 60, and the connections of the brake mechanisms therewith, that after the levers, 50 and 60, come into contact the front wheel brake mechanisms will be applied to a greater extent than the rear wheel brake mechanisms, it is obvious that we could so connect the brake mechanisms that the rear wheel brake mechanisms would be applied to a greater extent than the front wheel brake mechanisms after levers, 50 and 60, come into contact. This result would be accomplished for example in the construction shown in Figs. 2, 3 and 4, by shifting the connection of the link, 77, for example from the pivotal aperture, b, to the pivotal aperture, c.

With the arrangement previously described, adjustment of the brakes is only necessary to compensate for the wear of the braking surfaces. Whereas in our preferred embodiment, the front wheel brakes receive the maximum power for full deceleration, it is necessary to adjust them so as to prevent the operator operated part from striking the floor boards or other parts which might limit its movement, (or the piston from striking the end of the cylinder, where a power actuator is employed, as hereinafter described).

After the front wheel brakes have been so adjusted, the rear wheel brakes are preferably adjusted to give the amount of braking desired during a primary deceleration and upon a full application of the brakes.

We also prefer to provide an auxiliary power applying means, as an emergency hand lever for example, connected with the brake mechanisms which receive a lesser amount of force or are actually released after the initial movement, i. e., after the levers, 50 and 60, come together. Thus in Figs. 1 to 5 inclusive, we have shown the hand lever, 90, previously described, connected with the rock shaft for the rear wheel brake mechanisms only, in order that the physical force of the operator can be further applied to this set of brakes in case of emergency. The connection of this lever with the arm, 78$^a$, by means of a cable, and the connection of the link, 77$^a$, with the arm, 78$^a$, through the link, 78$^b$, permits of the operation of the rock shaft by either of the means shown without interfering with the other.

In Figs. 6 and 7 we have shown an arrangement similar to that illustrated in Figs. 1 to 5, except that the power applied to the brake mechanisms is obtained from a power actuator operated by differentials of fluid pressures conveniently obtained by a suction connection with the suction passage of the internal combustion engine which operates the vehicle, as the source of lower pressure, and atmosphere, as the source of higher pressure, the power of the actuator being supplemented when desired by the physical force of the operator. The parts shown in these figures and corresponding with those previously described with reference to Figs. 1 to 5, have been given the same reference numerals with the addition of 100 to avoid repetition. The arrangement of the levers, 150 and 160, and their connections with the front wheel brake mechanisms, A$^1$, and rear wheel brake mechanisms, B$^1$, are exactly the same as those shown in the previous figures. P represents a power actuator mounted on the chassis and comprising a cylinder, 1, and piston, 3, the piston rod, 5, being connected by link, 179, with the lever, 160. We have shown in this instance an actuator like that illustrated in our former Letters Patent of the United States, No. 1,583,117, granted May 4, 1926. In this instance the cylinder is closed at both ends and is connected at its forward end by a suction pipe, 62, provided with a check valve, 63, with the intake manifold, 61, of an internal combustion engine provided with the usual carburetor, 65, and throttle valve, 64. The controlling valve mechanism for the actuator is located in this instance in the piston and comprises a normally open suction valve, 40, and normally closed air inlet valve, 41, operatively mounted on a valve actuating sleeve, 20, which is connected with the foot lever, 188, by link, 188$^a$. A retracting spring, 15, which may be conveniently located within the hollow piston rod, 5, serves to retract the sleeve and foot lever and to hold the suction valve, 40, open in the released position of the parts, thereby placing the portion of the cylinder in rear of the piston in communication with the suction through port, 34, and maintaining the piston submerged in vacuum when in the released position. Air is admitted for actuating the piston through an inlet aperture, 10, and apertures, 24, in the valve actuating sleeve, 20, and the valve actuating sleeve is provided with a collar, 25, for limiting the lost motion between the valve actuating sleeve and the piston rod to enable the operator to apply his physical force to the piston and therefore to the link, 179, in addition to the power of the actuator or to operate the brake mechanisms by physical force alone in case of failure of power.

The operation of this modified embodiment of our invention will be exactly the same as that previously described except that the initial movement to apply all of the brake mechanisms substantially equally will be effected by the piston of the power actuator under the control of the valve mechanisms which is operated by the depression of the foot lever, and after the levers, 150 and 160, have been brought together, the power of the actuator will be unequally distributed between the front and rear wheel brakes in the manner previously described, and when the power of the actuator has been fully applied the operator may, by further depressing the foot pedal, add his physical force to that of the actuator which will be distributed in accordance with the connections, to the respective brake mechanisms.

In Fig. 6, we have also illustrated the auxiliary power applying means, to wit, the emergency hand lever, 190, connected with the rear wheel brake mechanisms by the cable, 177$^b$, and operating in the same manner as hereinbefore described.

In Fig. 6, we have also shown the link, 177$^a$, connected to the lever, 160, slightly above the point of pivoting the lever, 150, so that after the initial application of all the brakes to the predetermined extent, the further application of force by the actuator or by the physical force of the operator, or both, will be applied only to the front wheel brakes and will effect a partial release of the rear wheel brakes. We have therefore grouped in this figure practically all of the features of our invention in a single embodiment.

In Figs. 8 and 9, we have illustrated another modification of our invention in which the parts similar to those shown in Figs. 1 to 5 inclusive are given the same reference numerals with the addition of 200. In these figures we have illustrated the same arrangement of levers, 250 and 260, and their connections as previously described with reference to Figs. 1 to 5, and have shown them similarly connected to the front and rear wheel brake mechanisms, A² and B², respectively. In this construction we have shown a power actuator indicated at P¹, for applying power to the lever, 260, through the link, 279, under the control of valve mechanism, indicated at V, which is connected by a link, 288ª, with the foot lever, 288, but without means for connecting the foot lever with the lever, 260, to enable the operator to apply his physical force as previously described with reference to Figs. 6 and 7. In this instance the cylinder, 201, of the actuator is open at its rear end and closed at its forward end, and the valve mechanism illustrated in Fig. 9 is of the type covered by our previous application for Letters Patent filed November 7, 1927, and given Serial No. 231,724. The valve mechanism comprises a casing, indicated at 206, provided with an interior annular seat, 211, engaged by a diaphragm, 208, and dividing the rear half of the casing into a central chamber, 213, and an annular suction chamber, 212. The suction chamber is connected by a suction pipe, 262, with the intake manifold, 261, of the internal combustion engine, and the chamber, 213, is connected by a pipe, 214, with the closed end of the cylinder, 201, of the power actuator. Within the chamber, 213, is a disc valve, 210, adapted to seat on the diaphragm, and the diaphragm is provided with air inlet apertures, 219, communicating with the atmosphere through apertures, 218, in the front wall of the casing. 220 represents the valve actuating stem operatively connected with the diaphragm valve and disc valve and connected with the link, 288ª. The foot lever is provided with a retracting spring, 289, which normally forces the valve stem, 220, rearwardly with respect to the valve casing, and the valve casing is held by a spring, 206ª, connected with the vehicle, against a stop, 206ᵇ. The particular construction of this valve mechanism is not a part of our present invention and will not be further described except to say, in the released position of the parts the disc valve, 210, is unseated, thereby connecting the cylinder of the actuator forward of the piston with the atmosphere, and as the rear face of the piston is always subjected to atmospheric pressure, the piston is normally maintained submerged in air at atmospheric pressure. When the foot lever is depressed the disc valve will seat, closing off the cylinder from the atmosphere, and the diaphragm, 208, will be moved away from the seat, 211, to connect the cylinder with the suction pipe, 262, and effect an application of the power of the actuator to the levers, 250 and 260, in the manner previously described.

If the forward movement of the foot lever ceases at any point in the application of the brakes, the differential of fluid pressures on the opposite faces of the valves, 208 and 210, and on the rear portion of the valve casing will move the casing, 206, in the direction of the arrow Fig. 9, as soon as said differential is sufficient to overcome the increased tension which has been exerted on the spring, 206ª, by the forward movement of the valve mechanism bodily, thus causing the diaphragm, 208, to seat upon the seat, 211, preventing further evacuation of the actuator cylinder and holding the brakes as applied. In this modification of our invention also, we prefer to provide the emergency hand lever, 290, connected by cable, 277ᵇ, with an arm, 278ª, on the rock shaft, 276ª, connected with the rear wheel brake mechanisms and operating as hereinbefore described.

In Fig. 10, we have shown another slight modification of our invention, in which the corresponding parts to those shown in Figs. 1 to 5 are given the same reference numerals with the addition of 300. In this figure we have shown a power actuator indicated at P², of the kind just described with reference to Figs. 8 and 9, and connected with the levers, 360 and 350, in exactly the same manner, and controlled by valve mechanism, V², constructed in the same manner as the valve mechanism shown in Fig. 9, except that the valve casing is in this instance connected by a link, 306ª, with the lever, 360. In this instance the operation of the valve mechanism to effect the operation of the actuator will cause the forward movement of the valve casing, so that if the forward movement of the foot lever is stopped, the movement of the piston will effect a relative movement of the valve casing with respect to the valves and seat the diaphragm and hold the brakes as applied without depending upon differential of fluid pressures on the parts, and further the operator, by taking up the lost motion between the valve actuating stem and the valve casing indicated at the point, x, in Fig. 9, can add his physical force to the levers, 350 and 360, or apply the brakes by physical force alone in case of failure of power.

While the arrangement of the levers and their connections previously described provide a very convenient means for carrying our present invention into effect, it is to be understood that other lever arrangements may be employed to effect the same result, i. e., an equalization of force to the front and rear wheel brake mechanisms to effect an initial application of the brakes to a predetermined extent, and thereafter unequally distributing the additional force applied, to apply greater force or all of the force to certain brake mechanisms, as the front wheel brakes, and even in some instances effecting a release of the other brake mechanisms, as the rear wheel brake mechanisms.

Figure 11:
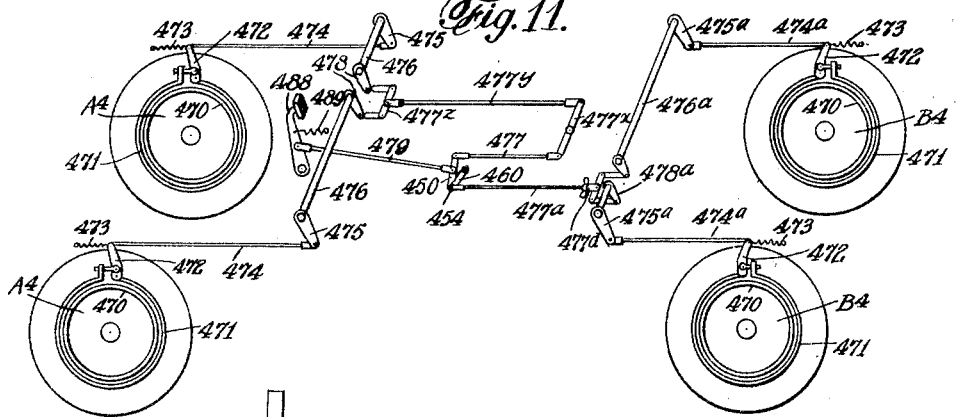
Fig. 11 is a view similar to Fig. 1, showing a modified form of connections between the power applying means and the brake mechanisms.
Figure 12:
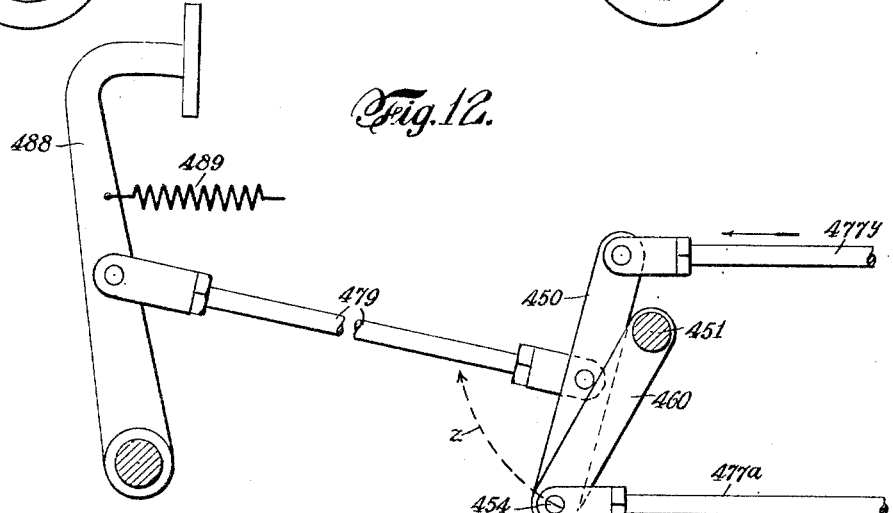
Fig. 12 is an enlarged detail view of the connections illustrated in Fig. 11 in their normal positions.

In Figs. 11, 12 and 13, for example, we have illustrated another embodiment of our invention, and in describing these figures, the parts corresponding with those shown in Figs. 1 to 5 inclusive, will be given the same reference characters with the addition of 400. In these figures, 450, represents the primary power applying lever having its upper end connected with the front wheel brake mechanisms, A⁴, A⁴, and as the upper end of the lever moves in a forward direction, indicated by the arrow in Fig. 12, the upper end of the lever, 450, is connected in any desired manner with the rock shaft, 476, which will produce the desired direction of movement thereof. In this instance it is shown connected by a link, 477, with a pivoted lever, 477ˣ, the other end of which is connected by a link, 477ʸ, with an equalizing lever, 477ᶻ, the ends of which are connected by links with arms, 478, 478, secured to separate rock shaft sections, 476, 476. The other end of the lever, 450, is pivotally connected at 454, with the lower end of the arm or lever, 460, which constitutes the secondary power applying lever, and has its upper end supported on a stationary pivot or shaft, 451, supported by the chassis. The lever, 460, is connected by link, 477ᵃ, with arms, 478ᵃ, on the rock shaft sections, 476ᵃ, connected with the rear wheel brake mechanisms, B⁴, B⁴. The lever, 450, is connected between its ends, by a link, 479, with the foot lever, 488, which is provided with the usual retracting spring, 489. With this construction it will be seen that the initial operation of the foot lever (or other power applying means) will draw the lever, 450, forwardly and upwardly, applying the force exerted by it substantially equally to the front and rear wheel brake mechanisms, and it will also be seen that the lever, 460, will swing into substantially horizontal position, as indicated in Fig. 13, the lower end of said lever following the arc indicated at z in Figs. 12 and 13, so that after this initial movement is completed, the further forward movement of the pedal will apply substantially all of the force exerted through it to the brake mechanisms for the front wheels, the lower end of the lever, 450, remaining substantially stationary, and the upper end of said lever moving in an arc, indicated in dotted lines at z′, in Fig. 13. Obviously the lever, 450, could be connected with the power actuator in any of the ways previously described.

As previously explained, the lever construction interposed between the power applying means and the brake for the front and rear wheels of the vehicle act to effect a uniform distribution which we term equalization of the power to the front and rear wheel brakes respectively, during the time when they are simultaneously applied. It will be understood that the power may also be equalized between the brakes for the front wheels and between the brakes for the rear wheels, by the use of well known equalizing means. We have shown such a construction in Figs. 14 and 15, in which the parts corresponding with those in Fig. 1 are given the same numerals with the addition of 500. The construction and operation of the levers, 550 and 560, are identical with those previously described with reference to Fig. 1, and the explanation need not be repeated in this instance. The link, 577, instead of being connected by a single arm with the rock shaft for the front wheel brakes, as in Fig. 1, is connected centrally to an equalizing bar, 578x, having its ends pivotally engaging arms, 578, connected with independent rock shaft sections, 576, so as to equalize the force applied by lever, 550, as between the front wheel brake mechanisms, A2, A2. In like manner, the lever, 560, is connected by a link, 577a, centrally to an equalizing bar 578y, the ends of which are pivotally connected with arms 578a, on rock shaft sections, 576a connected with the rear wheel brakes, B2, B2, for distributing the force applied through lever, 560, equally as between said rear wheel brake mechanisms. In this instance the emergency hand lever, 590, is shown connected by a cable, 577b, with the central portion of the equalizer, 578y.

What we claim and desire to secure by Letters Patent is:—

1. In a brake system for automotive vehicles, the combination with front wheel brake mechanisms and rear wheel brake mechanisms, of a primary power applying lever pivotally supported between its ends and connected to brake mechanisms for wheels at one end of the vehicle, a stop on said primary lever, a secondary power applying lever pivoted to said primary lever, connections from said secondary lever to brake mechanisms for wheels at the other end of the vehicle, a power applying means, connections therefrom to said secondary lever, said secondary lever being movable into contact with said stop on the primary lever by the movement of said power applying means to effect an initial application of all the brake mechanisms, said secondary lever thereafter moving with said primary lever to automatically distribute the further force exerted by said power applying means to the brake mechanisms for the opposite ends of the vehicle in a different proportion.

2. In a brake system for automotive vehicles, the combination with front wheel brake mechanisms and rear wheel brake mechanisms, of a primary power applying lever pivotally supported between its ends and having one end connected to the front wheel brake mechanisms, a stop on said primary lever, a secondary power applying lever pivoted to the opposite end of said primary lever, connections from said secondary lever to the rear wheel brake mechanisms, a power applying means, connections therefrom to said secondary lever between its pivotal connection with the primary lever and its connection with the rear wheel brake mechanisms, said levers forming an equalizing means between the front and rear wheel brake mechanisms, and said secondary lever being movable into contact with said stop on the primary lever by the application of force by said power applying means, to effect an initial application of all the brake mechanisms, and thereafter moving with said primary lever to effect the distribution of additional force exerted by said power means in unequal proportions to the front and rear wheel brake mechanisms.

3. In a brake system for automotive vehicles, the combination with front wheel brake mechanisms and rear wheel brake mechanisms, of a primary power applying lever pivotally supported between its ends and having one end connected to the front wheel brake mechanisms, a member secured to said primary lever, a secondary power applying lever pivoted to the opposite end of said primary lever, connections from said secondary lever to the rear wheel brake mechanisms, a power applying means, connections therefrom to said secondary lever, said secondary lever being movable into contact with said aforementioned member on the primary lever by the movement of said power applying means to effect an initial application of all the brake mechanisms, and thereafter moving with said primary lever to automatically distribute the further force exerted by said power applying means to the front and rear wheel brake mechanisms in a different proportion, the connection from the rear wheel brake mechanisms to said secondary lever having such relation to the pivotal support for the primary lever that said additional force will be transmitted entirely to the front wheel brake mechanisms.

4. In a brake system for automotive vehicles, the combination with front wheel brake mechanisms and rear wheel brake mechanisms, of a primary power applying lever pivotally supported between its ends and having one end connected to the front wheel brake mechanisms, a stop on said primary lever, a secondary power applying lever pivoted to the opposite end of said primary lever, connections from said secondary lever to the rear wheel brake mechanisms, a power applying means, connections therefrom to said secondary lever, said secondary lever being movable into contact with said stop on the primary lever between its pivotal support and its pivotal connection with the secondary lever by the movement of said power applying means to effect an initial application of all the brake mechanisms, and thereafter moving with said primary lever to automatically distribute the further force exerted by said power applying means to the front and rear wheel brake mechanisms in a different proportion, the connections between the rear wheel brake mechanisms and said secondary lever being so located with respect to the pivotal support for the primary lever that all of said additional force will be applied to the front wheel brake mechanisms and the rear wheel brake mechanisms will be partially released.

5. In a brake system for automotive vehicles, the combination with front wheel brake mechanisms and rear wheel brake mechanisms, of a primary power applying lever pivotally supported between its ends and having one end connected to the front wheel brake mechanisms, a secondary power applying lever pivoted to the opposite end of said primary lever, connections from said secondary lever to the rear wheel brake mechanisms, a power applying means, connections therefrom to said secondary lever, an adjustable stop on the primary lever, located between its pivotal support and its pivotal connection with the secondary lever, for engaging said secondary lever, said secondary lever being movable into contact with said stop by the movement of said power applying means to effect an initial application of all the brake mechanisms, and thereafter moving with the primary lever to automatically distribute the further force exerted by the said power applying means between the front and rear wheel brake mechanisms in a different proportion.

In testimony whereof we affix our signatures.

CALEB S. BRAGG.
VICTOR W. KLIESRATH.